US012278034B2

(12) United States Patent
Wang et al.

(10) Patent No.: US 12,278,034 B2
(45) Date of Patent: Apr. 15, 2025

(54) COIL DEVICE

(71) Applicant: TDK CORPORATION, Tokyo (JP)

(72) Inventors: Chen Wang, Tokyo (JP); Satoshi Sugimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 709 days.

(21) Appl. No.: 17/330,694

(22) Filed: May 26, 2021

(65) Prior Publication Data

US 2021/0375519 A1 Dec. 2, 2021

(30) Foreign Application Priority Data

May 28, 2020 (JP) ................................. 2020-093499

(51) Int. Cl.
*H01F 27/29* (2006.01)
*H01F 17/04* (2006.01)
*H01F 27/24* (2006.01)
*H01F 27/28* (2006.01)

(52) U.S. Cl.
CPC ............. *H01F 17/04* (2013.01); *H01F 27/24* (2013.01); *H01F 27/2847* (2013.01); *H01F 2017/048* (2013.01)

(58) Field of Classification Search
CPC ...... H01F 17/04; H01F 27/24; H01F 27/2847; H01F 2017/048; H01F 27/2852; H01F 27/292; H01F 27/06; H01F 2027/065
See application file for complete search history.

(56) References Cited

U.S. PATENT DOCUMENTS

| | | | | | |
|---|---|---|---|---|---|
| 7,280,025 | B2 * | 10/2007 | Sano | H05K 3/3426 336/200 |
| 7,525,406 | B1 * | 4/2009 | Cheng | H01F 27/306 336/83 |
| 2007/0176726 | A1 * | 8/2007 | Xu | H01F 37/00 336/229 |
| 2008/0272874 | A1 * | 11/2008 | Chang | H01F 27/29 336/61 |
| 2011/0205008 | A1 * | 8/2011 | Brennan | H01F 27/2847 336/221 |
| 2011/0228507 | A1 * | 9/2011 | Yin | H05K 1/18 361/811 |
| 2015/0170820 | A1 * | 6/2015 | Kadir | H01F 27/306 29/606 |
| 2015/0332844 | A1 * | 11/2015 | Xiong | H01F 27/24 336/5 |
| 2017/0178795 | A1 * | 6/2017 | Todorov | H05K 3/308 |
| 2017/0178797 | A1 * | 6/2017 | Todorov | H01F 27/2847 |
| 2017/0345545 | A1 * | 11/2017 | Liu | H05K 1/181 |
| 2019/0237245 | A1 | 8/2019 | Ashizawa et al. | |

(Continued)

FOREIGN PATENT DOCUMENTS

| | | | |
|---|---|---|---|
| JP | 2017-139356 | A | 8/2017 |
| JP | 2019-134147 | A | 8/2019 |
| JP | 2019-153642 | A | 9/2019 |

*Primary Examiner* — Mang Tin Bik Lian
(74) *Attorney, Agent, or Firm* — Oliff PLC

(57) ABSTRACT

A coil device includes a core, a coil, a mounting part, and a bottom raising part. The coil is at least partly disposed close to the core. The mounting part is mounted on an installation surface. The bottom raising part is connected with the coil and extends to the mounting part so as to form a gap having a predetermined height between the mounting part and a bottom surface of the core.

12 Claims, 9 Drawing Sheets

(56) References Cited

U.S. PATENT DOCUMENTS

| | | | | |
|---|---|---|---|---|
| 2019/0272945 | A1 | 9/2019 | Arai et al. | |
| 2020/0152372 | A1* | 5/2020 | Wei | H01F 17/04 |
| 2021/0020352 | A1* | 1/2021 | Okano | H01F 27/303 |

* cited by examiner

COIL DEVICE

BACKGROUND OF THE INVENTION

The present invention relates to a coil device favorably used as, for example, an inductor.

As a chip coil to be mounted on a substrate or so, known is a coil device in which a conductor serving as a coil is disposed to penetrate a core covering the conductor. In this type of coil device, a mounting part of a terminal of the coil and a bottom surface of the core are in the same plane, and the mounting part and the bottom surface of the core contact with an installation surface at the time of mounting (Patent Document 1).

From the demand for miniaturization of devices incorporating electronic components, there is more and more demand for miniaturization of electronic devices incorporating coil devices used for power supply systems or so. Thus, there is a demand for the development of coil devices capable of downsizing electronic devices more than ever before.

Patent Document 1: JP2019153642 (A)

BRIEF SUMMARY OF INVENTION

The present invention has been achieved under such circumstances. It is an object of the invention to provide a coil device capable of further miniaturizing an entire product of an electronic device on which the coil device is mounted.

To achieve the above object, a coil device according to the present invention comprises:

a core;

a coil at least partly disposed close to the core;

a mounting part for being mounted on an installation surface; and a bottom raising part connected with the coil and extending to the mounting part so as to form a gap having a predetermined height between the mounting part and a bottom surface of the core.

When the coil device according to the present invention is mounted on, for example, a substrate, a gap is formed between the bottom surface of the core and the installation surface. In this gap, another electronic component or so, such as an IC and a capacitor, can be mounted. When another electronic component or so is mounted in this gap, the substrate does not need to have a space for mounting another electronic component. Thus, the mounting area can be reduced in total, and electronic devices are downsized. The coil device according to the present invention is preferably used as, for example, an inductor of a power supply system.

The predetermined height is not limited, but is preferably 0.5-5.0 mm, more preferably 0.5-3.0 mm, still more preferably 0.5-2 mm. When the predetermined height is in such a range, another electronic component or so can easily be attached to the gap between the installation surface and the bottom surface of the core, and the mounting height of the coil device does not become larger than necessary.

Preferably, the coil and the bottom raising part are made of one continuous plate conductor or flat wire. In this structure, the coil device including the bottom raising part can easily be formed by bending a plate-shaped conductor (or a flat wire/the same applies hereinafter).

The mounting part may be connected to the bottom raising part by another member. Preferably, however, the mounting part is connected by being formed as a lower end of the bottom raising part. Instead, the mounting part may be connected by being formed as a single plate-shaped conductor or flat wire continuing to the bottom raising part. The bottom raising part continuing to the mounting part enables the bottom surface of the core to be positioned higher than the mounting part and forms a gap between the bottom surface of the core and the installation surface. Another electronic component can be mounted in this gap.

Preferably, the bottom raising part is as wide as the mounting part. The bottom raising part and the mounting part with such a structure can easily be obtained by, for example, integrally forming a single plate-shaped conductor. The mounting part and the bottom raising part and can have a similar electrical resistance. The mounting part may be wider than the bottom raising part. This structure can reduce the electrical resistance of the mounting part and improves the mounting stability.

Preferably, the mounting part extends from a lower end of the bottom raising part toward a direction away from the core. In this structure, a solder fillet is formed inside the bottom raising part at the time of mounting the coil device onto a substrate or so. As a result, the coil device can stably be fixed on the substrate.

Preferably, the mounting part extending in the direction away from the core is longer than the predetermined height. In this case, the coil device can more stably be mounted on the substrate or so.

Preferably, the coil includes: an end coil part connected to the bottom raising part; and a middle coil part connected to the end coil part. In this structure, the entire length of the coil close to the core is large, and the inductance to be obtained can be improved. The middle coil part and the end coil part can be formed at the same time by bending a single plate-shaped conductor. The middle coil part and the end coil part may extend linearly in directions substantially perpendicular to each other.

A width of the bottom raising part may be equal to or larger than a maximum width of the middle coil part and equal to or smaller than a maximum width of the core. When the bottom raising part has a width in such a range, the coil device can more stably be mounted.

The bottom raising part may include a plurality of leg parts, and the end coil part may include: a main end coil part connected to the middle coil part; and joint parts connecting the main end coil part and the plurality of leg parts. When the bottom raising part includes a plurality of leg parts, the coil device can more stably be mounted on the board or so while being raised. The electric resistance of the bottom raising part can further be reduced.

The middle coil part may include: a plurality of main middle coil parts; and a sub middle coil part connecting the main middle coil parts next to each other. In this structure, the entire length of the coil close to the core is large, and the inductance to be obtained can be improved.

The core may include: a main core; and a sub core disposed on an upper surface of the main core, and the coil may at least partly be sandwiched by the main core and the sub core. The main core may include a groove for accommodating at least a part of the coil. When the core can be divided into the main core and the sub core, a conductor serving as the coil can easily be disposed in the groove formed inside the core.

The core may not be divided into the main core and the sub core. The coil may be insert-molded in the core formed integrally. At least either one of the main core and the sub core may be a molded core. At least either one of the main core and the sub core preferably contains a magnetic material, but both of the cores may be made of a resin, a ceramic, or the like containing no magnetic material.

DETAILED DESCRIPTION OF INVENTION

Hereinafter, the present invention is explained based on embodiments shown in the figures.

First Embodiment

Figure 1A:
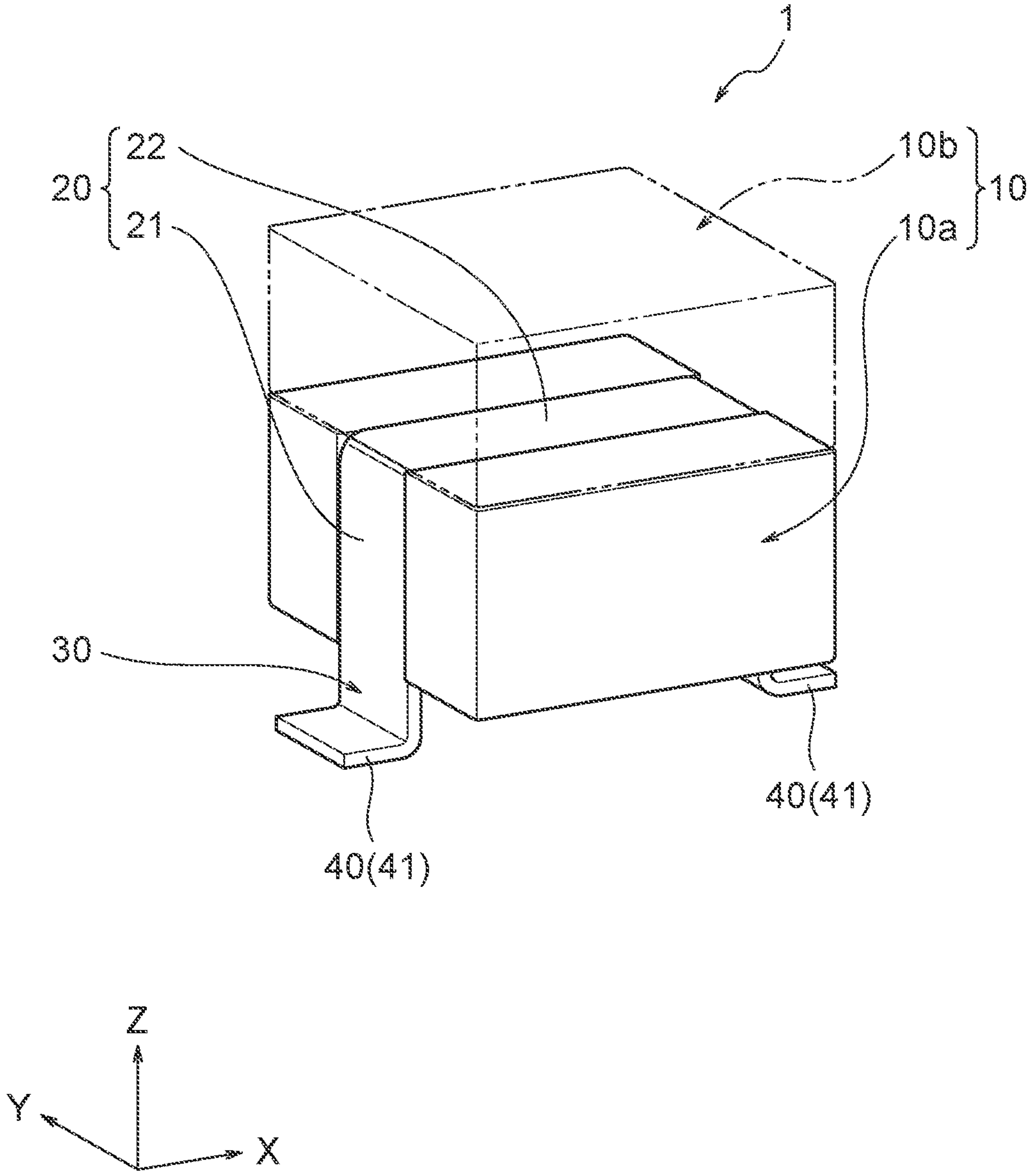
FIG. 1A is a partially transparent perspective view of a coil device according to an embodiment of the present invention.

A coil device 1 according to an embodiment of the present invention shown in FIG. 1A is used, for example, as a surface mount inductor for a power supply system circuit. The coil device 1 includes a core 10 and a coil 20. The core 10 includes a substantially rectangular parallelepiped main core 10*a* and a substantially rectangular parallelepiped sub core 10*b* disposed above the main core 10*a* in the Z-axis direction. A middle coil part 22 of the coil 20 is sandwiched by the cores 10*a* and 10*b* and linearly extends in the X-axis direction. In FIG. 1A (the same applies to the other figures), the X-axis (first axis), the Y-axis (second axis), and the Z-axis (third axis) are perpendicular to each other.

Figure 2A:
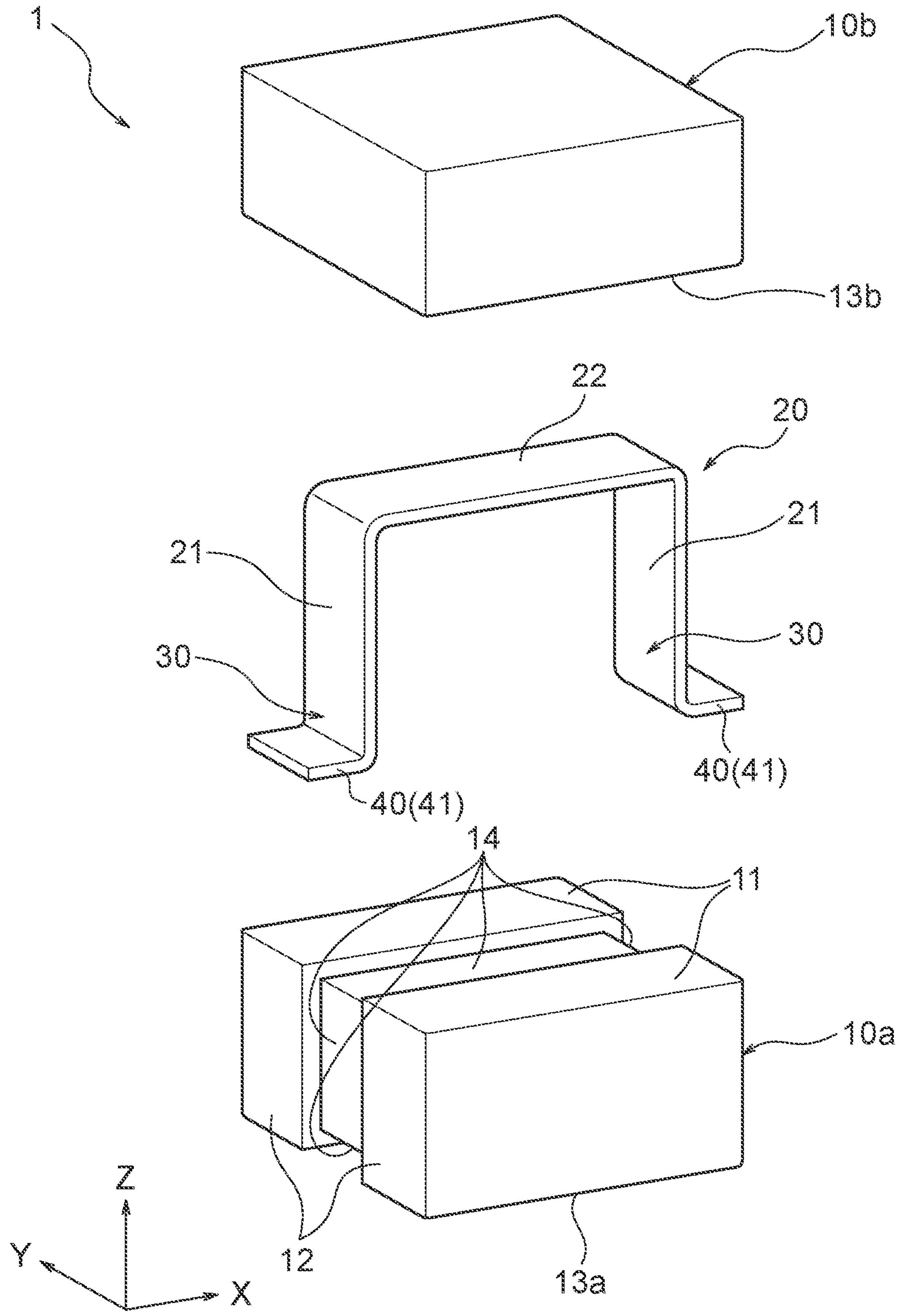
FIG. 2A is an exploded perspective view of the coil device shown in FIG. 1A.

In the present embodiment, as shown in FIG. 2A, the coil 20 includes the middle coil part 22 extending in the X-axis direction and a pair of end coil parts 21 integrally connected to both ends of the middle coil part 22 and extending in the Z-axis direction. A bottom raising part 30 (30) extending in the Z-axis direction is integrally connected to the lower end of the end coil part 21 (21) in the Z-axis direction. At the lower end of the bottom raising part 30 (30) in the Z-axis direction, a bending piece 41 (41) as a mounting part 40 (40) is formed by bending outward from the bottom raising part 30 (30) in the X-axis direction.

In the present embodiment, the coil 20, the bottom raising part 30 (30), and the bending piece 41 (41) are obtained by pressing a sheet of plate-shaped conductor, the middle coil part 22 of the coil 20 extends linearly in the X-axis direction, the end coil part 21 (21) and the bottom raising part 30 (30) extend linearly in the Z-axis direction on the same plane, and the bending piece 41 (41) extends outward from the core 10 in the X-axis direction on the same straight line as the middle coil part 22. In the present embodiment, the coil 20, the bottom raising part 30 (30), and the bending piece 41 (41) are arranged on a straight line in the X-axis direction and all have the same width in the Y-axis direction.

The plate-shaped conductor constituting the coil 20, the bottom raising part 30 (30), and the bending piece 41 (41) is not limited and is, for example, a metal, such as copper, copper alloy, silver, and gold. For example, the surface of the plate-shaped conductor is metal-plated, such as nickel plating, tin plating, solder plating, and silver plating. The plating may consist of a single layer or a plurality of layers. Preferably, the metal plating is formed at least on one surface of the plate-shaped conductor to which the solder adheres or both surfaces of the plate-shaped conductor.

In the plate-shaped conductor, an insulating film may be formed on the surface of the coil 20 contacted with the main core 10*a* or the sub core 10*b*. This is because when the surface of the core 10*a* (10*b*) is a conductor, like the core 10*a* (10*b*) containing, for example, a metal magnetic material, this surface is preferably insulated. Incidentally, an insulating film may be formed on the surfaces of the cores 10*a* and 10*b*.

Figure 3:
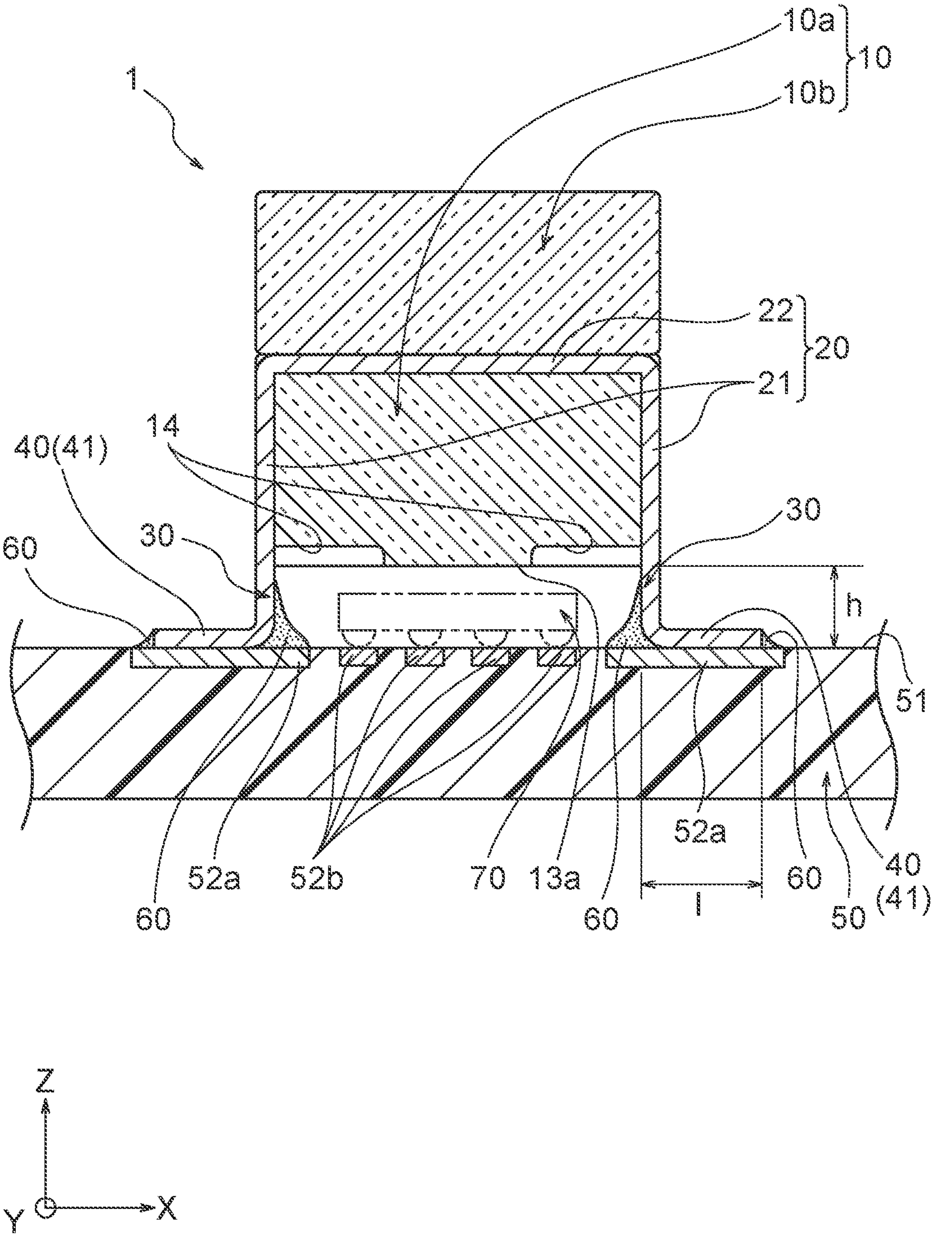
FIG. 3 is a schematic cross-sectional view of the coil device shown in FIG. 1A mounted on a substrate.

In the plate-shaped conductor, as shown in FIG. 3, the lower surface of the bending piece 41 (mounting part 40) is electrically connected to, for example, a land 52*a* of the substrate 50, and a conductor part of the lower surface of the bending piece 41 (mounting part 40) is thus preferably exposed without forming an insulating film. Preferably, a conductor part of the inner surface of the bottom raising part 30 (30) is exposed so as to form a fillet of the solder 60 thereon.

In the present embodiment, as shown in FIG. 2A, a core upper surface 11 of the main core 10*a* is fixed and integrated to a core bottom surface 13*b* of the sub core 10*b* using an adhesive agent (not shown), and the middle coil part 22 of the coil 20 is sandwiched by the core upper surface 11 and the core bottom surface 13*b*. The length of the main core 10*a* in the X-axis direction is substantially the same as that of the middle coil part 22 in the X-axis direction. The length of the main core 10*a* in the Z-axis direction is substantially the same as that of the end coil part 21 (21) in the Z-axis direction.

The main core 10*a* includes a groove 14 over the core upper surface 11, a pair of core side surfaces 12 facing each other in the X-axis direction, and a core bottom surface 13*a*. The groove 14 on the core upper surface 11 is formed in the X-axis direction at the center in the Y-axis direction and has a depth that is equal to or larger than a thickness of the middle coil part 22 in the Z-axis direction. The groove 14 on the core side surface 12 (12) is formed in the Z-axis direction at the center in the Y-axis direction and has a depth that is equal to or larger than a thickness of the end coil part 21 (21).

As shown in FIG. 3, both ends of the groove 14 are not connected on the core bottom surface 13*a*, and the groove 14 is not formed with a predetermined length in the X-axis direction at a central part of the core bottom surface 13*a* in the X-axis direction. In the present embodiment, the groove 14 may be formed only on the upper surface 11 of the main core 10*a* or the lower surface 13*b* of the sub core 10*b* and may not be formed on the side surface 12 (12) or the lower surface 13*a*.

When the groove 14 is also formed on the side surface 12 (12) of the main core 10*a*, however, the outer surface of the end coil part 21 (21) is prevented from protruding from the side surface 12 (12), and the coil device 1 is downsized. When the end coil part 21 (21) enters the groove 14, the magnetic coupling with the core 10 is strengthened, and the inductance is improved. As shown in FIG. 3, the fillet of the solder 60 can be prevented from contacting with the bottom surface 13*a* of the core 10 by also forming the groove 14 on the bottom surface of the main core 10*a*.

In the coil device 1 according to the present embodiment, the middle coil part 22 is accommodated in the groove 14 on the upper surface 11 of the main core 10*a*, and the end coil part 21 (21) is accommodated in the groove 14 on the core side surface 12 (12). In the present embodiment, the middle coil part 22 and the groove 14 are fixed with an adhesive agent not shown, but the end coil part 21 (21) and the groove 14 may be fixed with an adhesive agent. Incidentally, the middle coil part 22 and the groove 14 are not necessarily fixed with an adhesive agent if the core 10 and the coil 20 are not separated when mounted on the substrate 50 (see FIG. 3).

The main core 10*a* and the sub core 10*b* constituting the core 10 are each made of a composite magnetic material containing ferrite or a magnetic material, such as a metal magnetic material (including an amorphous alloy magnetic material), and a resin. That is, the main core 10*a* and the sub core 10*b* may be made of, for example, a molded core. Instead, the main core 10*a* may be a sintered body of a magnetic material. Likewise, the sub core 10*b* is made of a composite magnetic material containing a magnetic material and a resin. Instead, the sub core 10*b* may be a sintered body of a magnetic material. For example, the metal magnetic material is a Co based amorphous alloy.

Incidentally, the main core 10*a* and the sub core 10*b* may be made of different types of magnetic material, or the sub core 10*b* (or the main core 10*a*) may be made of a nonmagnetic material, such as resin and ceramic. Instead, both of the main core 10*a* and the sub core 10*b* may be made of a nonmagnetic material, such as resin and ceramic.

In the coil device 1 according to the present embodiment, the bottom raising part 30 (30) is formed integrally with the coil 20, and as shown in FIG. 3, a gap h having a predetermined height is formed between the lower surface of the mounting part 40 (40) (an installation surface 51 of the substrate 50) located at the lower end of the bottom raising part 30 (30) and the bottom surface 13*a* of the core 10. The gap h is preferably substantially uniform in the X-axis direction, but may not slightly be uniform in the X-axis direction.

In the gap h, another electronic component 70, such as an IC and a capacitor, can be mounted alone or in plurality. Another electronic component 70 can be disposed in the space corresponding to the gap h and mounted by connecting to a land 52*b* disposed between the lands 52*a* and 52*a* of the substrate 50. Thus, the substrate 50 does not need to have a space for mounting another electronic component 70 separately from a mounting space of the coil device 1, and the mounting area can be reduced in total. As a result, electronic devices are downsized. Thus, the coil device 1 according to the present embodiment is preferably used as, for example, an inductor of a power supply system electronic device that is required to be miniaturized.

The predetermined height h is not limited, but is preferably 0.5-5.0 mm, more preferably 0.5-3.0 mm, still more preferably 0.5-2 mm. When the predetermined height h is in such a range, another electronic component 70 or so can easily be attached to the gap h between the installation surface 51 and the bottom surface 13*a* of the core 10, and the mounting height of the coil device 1 does not become larger than necessary.

In the present embodiment, since the coil 20 and the bottom raising part 30 (30) are made of a single continuous plate-shaped conductor, the coil device 1 including the bottom raising part 30 (30) can easily be formed by bending the plate-shaped conductor.

In the present embodiment, since the bottom raising part 30 (30) is connected to the mounting part 40 (40) for being mounted on the installation surface 51, the bottom surface 13*a* of the core is disposed higher than the mounting part 40 (40), and the gap h is formed between the bottom surface 13*a* and the installation surface 51. In the gap h, another electronic component 70 can be mounted easily.

In the present embodiment, the width of the bottom raising part 30 (30) (in the Y-axis direction/the same applies hereinafter) is substantially the same as the width of the mounting part 40. The bottom raising part 30 (30) and the mounting part 40 (40) with such a structure can easily be obtained by, for example, integrally forming a single plate-shaped conductor. The bottom raising part 30 (30) and the mounting part 40 (40) can have a similar electrical resistance. The mounting part 40 (40) may be wider than the bottom raising part 30 (30). This structure can reduce the electrical resistance of the mounting part 40 (40) and improves the mounting stability.

In the present embodiment, since the mounting part 40 (40) extends from the lower end of the bottom raising part 30 (30) in a direction away from the core 10, a fillet of the solder 60 is formed inside the bottom raising part 30 (30) at the time of mounting the coil device 1 onto the substrate 50. As a result, a stress is generated in a direction where the pair of end coil parts 21 tightens the main core 10*a* from both sides in the X-axis direction due to the fillet of the solder 60 existing inside the bottom raising part 30 (30). Thus, the coil device 1 can stably be fixed on the substrate 50.

In the present embodiment, since the length of the mounting part 40 (40) extending in a direction away from the core 10 is larger than the predetermined gap h, the coil device 1 can more stably be mounted on the substrate 50.

In the present embodiment, the coil 20 includes the end coil part 21 (21) connected to the bottom raising part 30 (30) and the middle coil part 22 connected to the end coil part 21 (21). Thus, the entire length of the coil 20 close to the core 10 (including "contact"/the same applies hereinafter) becomes large, and the inductance of the coil device 1 to be obtained can be improved. The middle coil part 22 and the end coil part 21 (21) can be formed at the same time by bending a single plate-shaped conductor.

In the present embodiment, a width of the bottom raising part 30 (30) may be equal to or larger than a maximum width of the middle coil part 22 and is equal to or smaller than a maximum width of the core 10. When the width of the bottom raising part 30 (30) is in such a range, the coil device 1 can be mounted more stably.

In the present embodiment, the core 10 is divided into the main core 10*a* and the sub core 10*b*, and the middle coil part 22 of the coil 20 is embedded into the core 10 between the main core 10*a* and the sub core 10*b* by combining them, but the middle coil part 22 of the coil 20 may be insert-molded in the core 10 formed integrally. That is, the middle coil part 22 of the coil 20 may be insert-molded in a single core 10 without integrating the main core 10*a* and the sub core 10*b* using an adhesive agent.

In the above-mentioned embodiment, the coil 20, the bottom raising part 30 (30), and the mounting part 40 (40) are formed integrally by a single plate-shaped conductor, but may be formed integrally by a flat conductor.

In another embodiment of the present invention, only the middle coil part 22 of the coil 20 may be made of a wire conductor or a flat conductor, and a plate-shaped conductor consisting of the end coil parts 21, the bottom raising parts 30, and the mounting parts 40 may electrically be connected to both ends of the middle coil part 22. Instead, the middle coil part 22, the end coil part 21 (21), and the bottom raising part 30 (30) and the mounting part 40 (40) may be made of different conductors, and these conductors may be connected electrically, but at least the end coil part 21 (21) and the bottom raising part 30 (30) are preferably integrally made of the same conductor.

In another embodiment of the present invention, the main core 10*a* and the sub core 10*b* may be formed longer in the Y-axis direction, a plurality of grooves 14 may be formed at predetermined intervals in the Y-axis direction, and the coil 20 may be disposed in each of the grooves 14. In this case, it is possible to obtain the coil device in which the coils 20 are integrated in parallel.

Second Embodiment

Figure 1B:
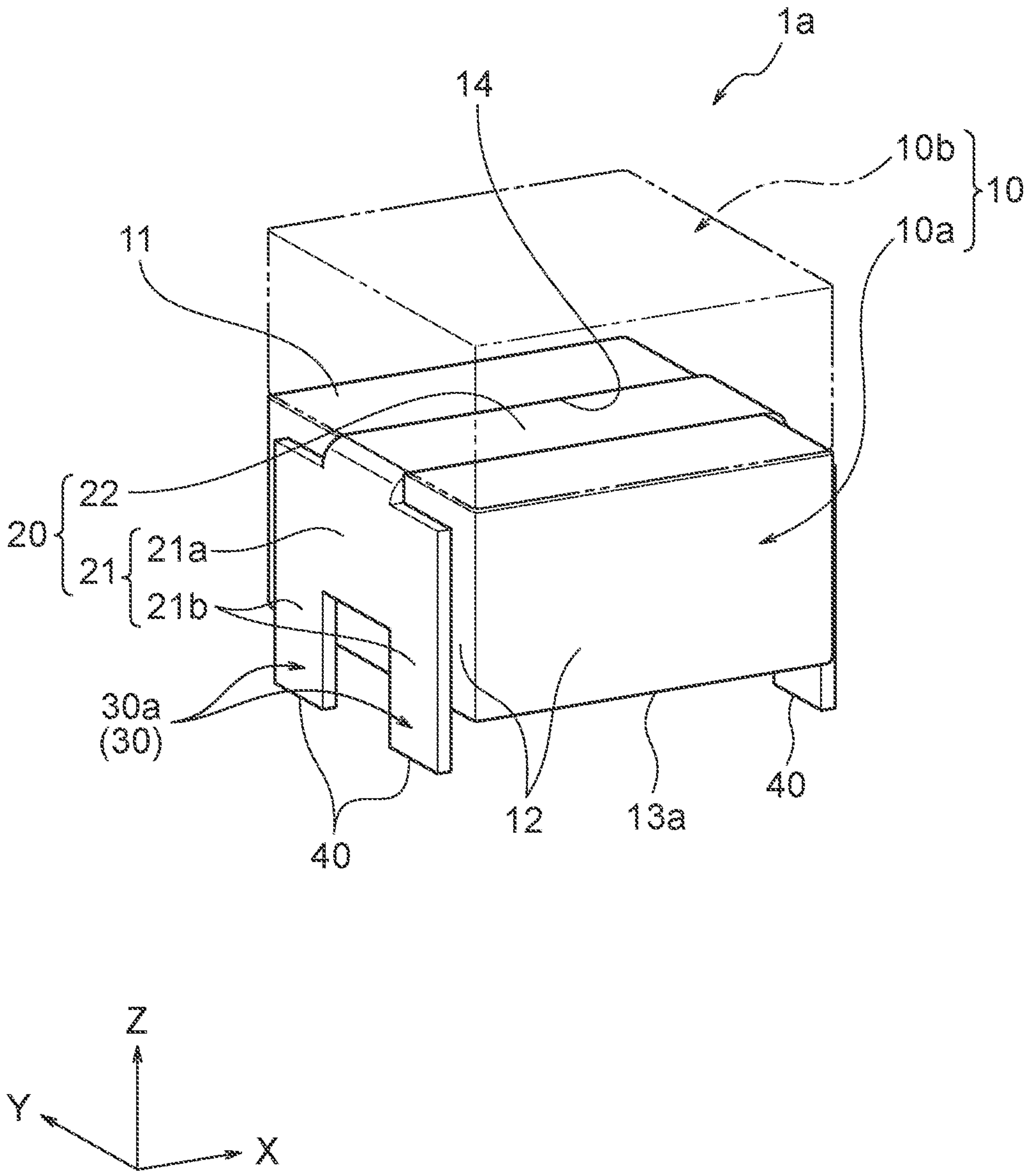
FIG. 1B is a partially transparent perspective view of a coil device according to another embodiment of the present invention.
Figure 2B:
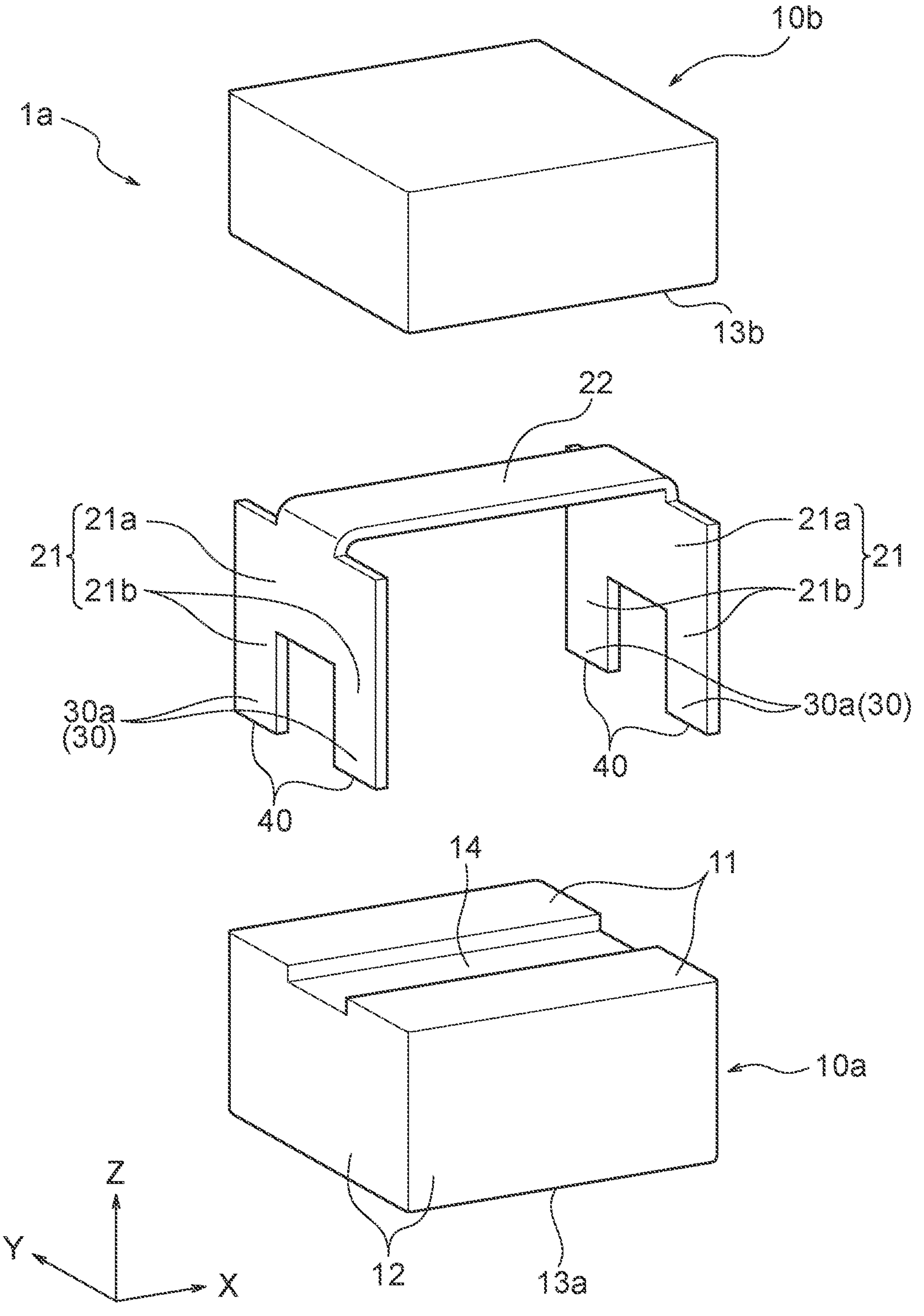
FIG. 2B is an exploded perspective view of the coil device shown in FIG. 1B.

As shown in FIG. 1B and FIG. 2B, a coil device 1*a* according to the present embodiment is different from the coil device 1 according to the above-mentioned embodiment only in the structure of the end coil part 21 of the coil 20, the structure of the bottom raising part 30, and the structure of the groove 14 formed on the main core 10*a*. The other structure and effect are similar to those of the coil device 1 according to the above-mentioned embodiment. Thus, the common parts are not partly explained.

In the coil device 1*a* according to the present embodiment, the bottom raising part 30 (30) includes a plurality of leg parts 30*a*, and the end coil part 21 (21) includes: a main end coil part 21*a* connected to the middle coil part 22; and joint parts 21*b* connecting the main end coil part 21*a* and the plurality of leg parts 30*a*. A width of the main end coil part 21*a* (21*a*) (in the Y-axis direction/the same applies hereinafter) is larger than that of the middle coil part 22. In the illustrated example, the width of the main end coil part 21*a* (21*a*) is 1.5 times or larger than that of the middle coil part 22 and is smaller than that of the main core 10*a*.

The width of the joint part 21*b* (21*b*) and the width of the leg part 30*a* (30*a*) are substantially the same and are each substantially the same as that of the middle coil part 22. The joint part 21*b* (21*b*) and the leg part 30*a* (30*a*) continuously formed below the joint part 21*b* (21*b*) linearly extend downward in the Z-axis direction from both ends of the main end coil part 21*a* in the Y-axis direction. The lower end of the leg part 30*a* (30*a*) is the mounting part 40 (40). The boundary between the joint part 21*b* (21*b*) and the leg part 30*a* (30*a*) continuously formed below the joint part 21*b* (21*b*) is around the bottom surface 13*a* of the main core 10*a* and is not clearly determined.

In the present embodiment, the end coil part 21 (21) and the leg parts 30*a* are formed from a single plate-shaped conductor by pressing or so together with the middle coil part 22, and the part located close to the side surface 12 of the main core 10*a* is defined as the main end coil part 21*a*. In the end coil part 21 (21), a part that is wider than the leg part 30*a* (30*a*) can be defined as the main end coil part 21*a* (21*a*), and a branched part that is narrower than the main end coil part 21*a* (21*a*) can be defined as a plurality of joint parts 21*b* (21*b*).

In the present embodiment, the groove 14 is formed only on the upper surface 11 of the main core 10*a*, and the middle coil part 22 is accommodated in the groove 14. The end coil part 21 (21) and the bottom raising parts 30 (30) (leg parts 30*a* (30*a*)) are arranged on the same plane along the side surfaces 12 of the main core 10*a* located opposite to each other in the X-axis direction. As with the above-mentioned embodiment, the bottom raising parts 30 each consisting of a plurality of leg parts 30*a* form the gap h shown in FIG. 3 between the mounting parts 40 (the installation surface 51 of the substrate 50), which are the lower ends of the bottom raising parts 30, and the bottom surface 13*a*.

In the present embodiment, a fillet of the solder 60 can be formed only on the inner surface of the bottom raising part 30 (30) consisting of the plurality of leg parts 30*a* (30*a*), but may also be formed on the outer surface of the bottom raising part 30 (30). To form the fillet of the solder 60 only on the inner surface of the bottom raising part 30 (30) consisting of the plurality of leg parts 30*a* (30*a*), the following methods can be considered: leaving an insulating film on the outer surface of the bottom raising part 30 (30); subjecting the outer surface of the bottom raising part 30 (30) to a surface treatment for preventing solder adhesion; or the like.

In the present embodiment, since the bottom raising part 30 (30) includes the plurality of leg parts 30*a*, the coil device 1*a* can stably be mounted on the substrate 50 without forming the bending piece 41 (41) shown in FIG. 1A while the bottom surface 13*a* of the core 10 of the coil device 1*a* is being raised, and the electric resistance of the bottom raising part 30 (30) can further be reduced. In the present embodiment, the bending pieces 41 as shown in FIG. 1A may also integrally be formed with the leg parts 30*a* (30*a*) to form the mounting parts 40 (40).

In the present embodiment, the end coil part 21 (21) consists of the main end coil part 21*a* and a plurality (a pair in the figures) of joint parts 21*b*, but may consist of only the main end coil part 21*a*. That is, the main end coil part 21*a* of the end coil part 21 (21) may directly be connected to the leg parts 30*a* without the joint parts 21*b*. The pair of leg parts 30*a* may be a single leg part continuing in the Y-axis direction and may continuously be formed from the main end coil part 21*a* with the width of the main end coil part 21*a*.

Third Embodiment

Figure 1C:
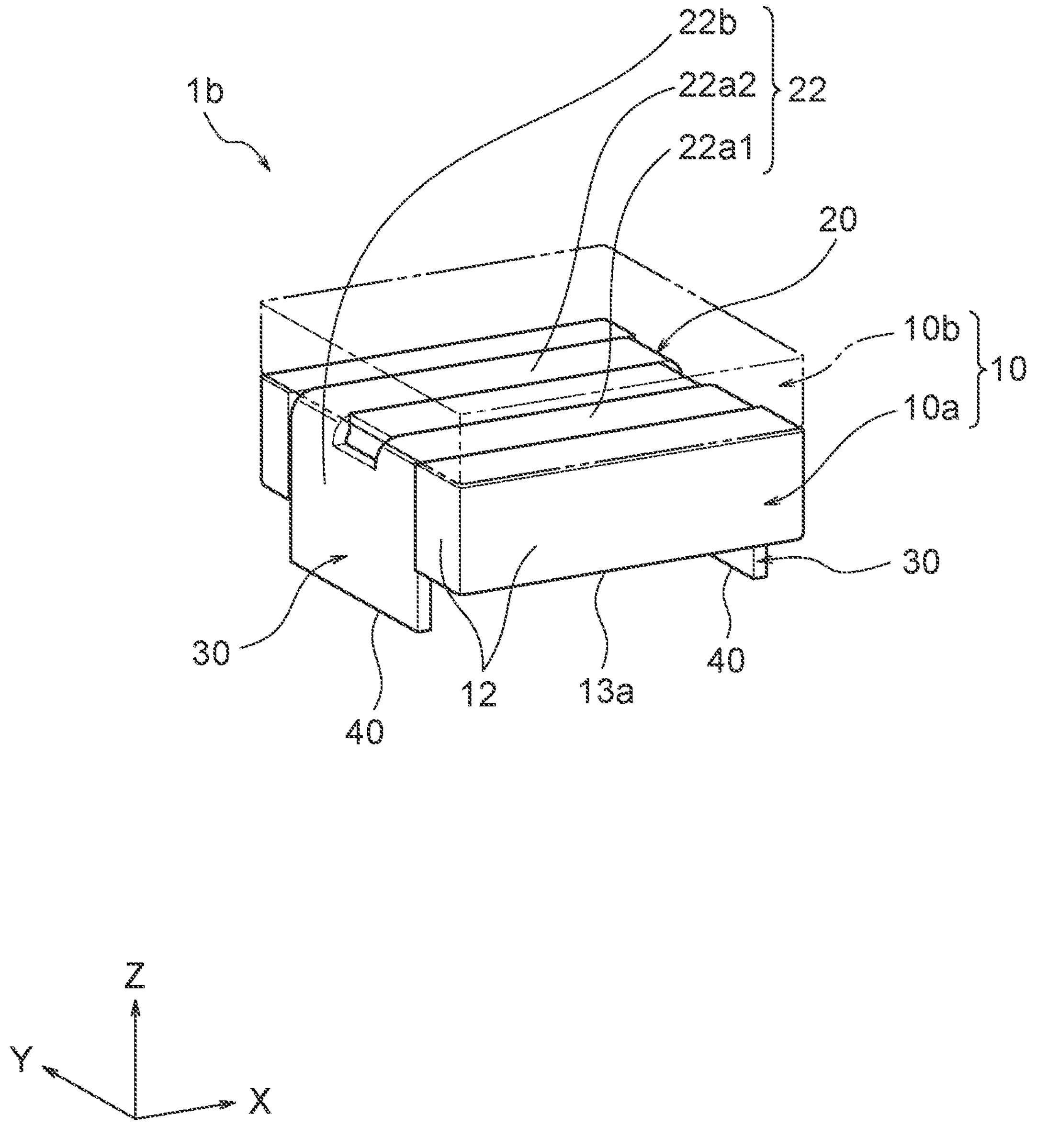
FIG. 1C is a partially transparent perspective view of a coil device according to further another embodiment of the present invention.
Figure 2C:
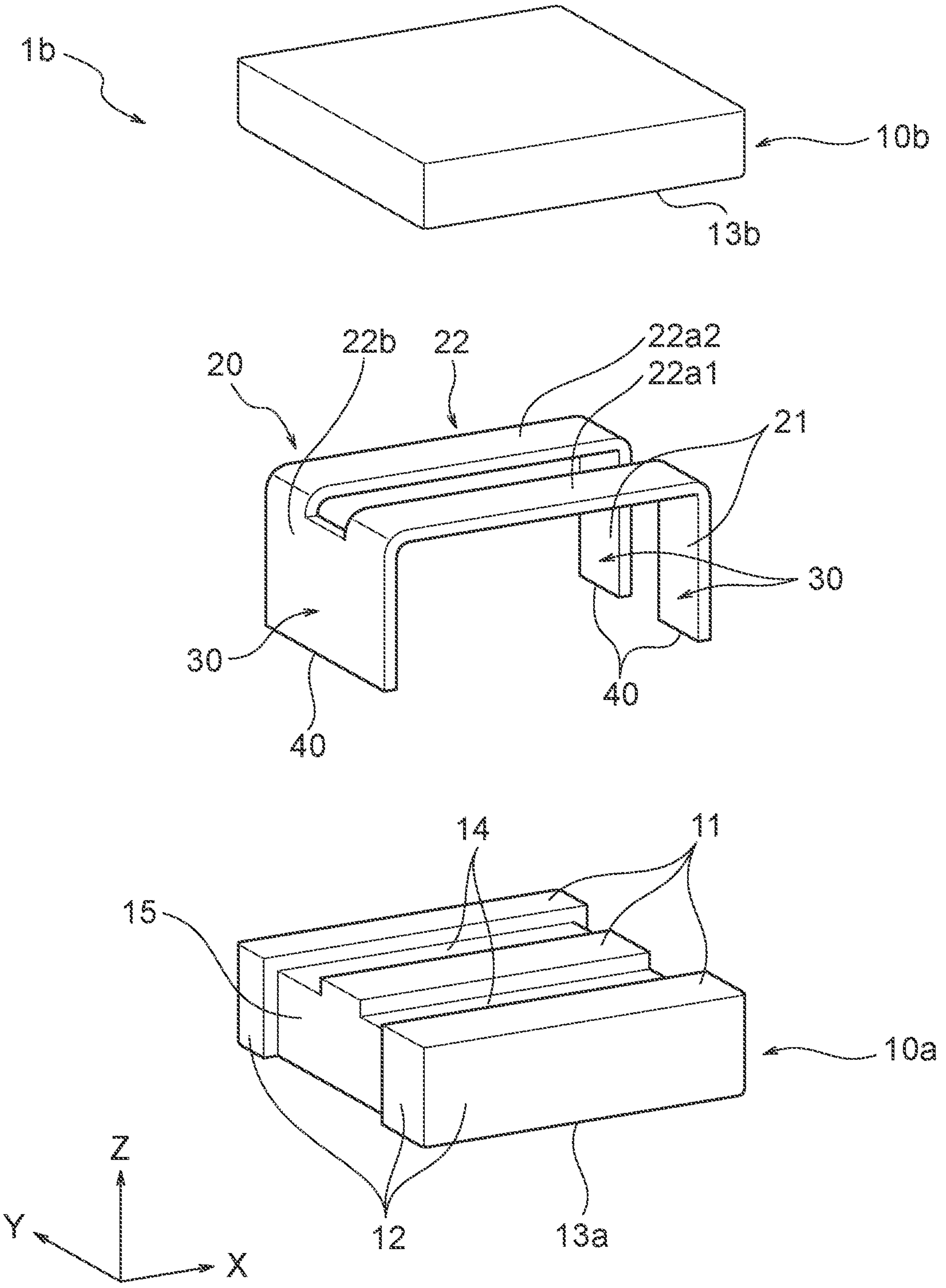
FIG. 2C is an exploded perspective view of the coil device shown in FIG. 1C.

As shown in FIG. 1C and FIG. 2C, a coil device 1*b* according to the present embodiment is different from the coil devices 1 and 1*a* according to the above-mentioned embodiments only in the structure of the coil 20, the structure of the bottom raising part 30, and the structure of the groove 14 formed on the main core 10*a*. The other structure and effect are similar to those of the coil devices 1 and 1*a* according to the above-mentioned embodiments. Thus, the common parts are not partly explained.

In the coil device 1*b* according to the present embodiment, the middle coil part 22 of the coil 20 includes: a plurality of main middle coil parts 22*a*1 and 22*a*2; and a sub middle coil part 22*b* connecting the main middle coil parts 22*a*1 and 22*a*2 next to each other. The main middle coil parts 22*a*1 and 22*a*2 are accommodated in a plurality of grooves 14 formed on the upper surface of the main core 10*a* and are linearly arranged in the X-axis direction substantially in parallel at a predetermined interval in the Y-axis direction.

At the right end of the main middle coil part 22*a*1 in the X-axis direction disposed on one end side (front side) in the Y-axis direction, the end coil part 21 is connected by bending downward in the Z-axis direction with substantially the same width as the main middle coil part 22*a*1 (in the Y-axis direction/the same applies hereinafter). The bottom raising part 30 is integrally continuous to the lower end of the end coil part 21 in the Z-axis direction on the same plane with substantially the same width as the end coil part 21. The lower end of the bottom raising part 30 (30) is formed as the mounting part 40.

At the left ends of the main middle coil parts 22*a*1 and 22*a*2 in the X-axis direction, the sub middle coil part 22*b* is formed by bending downward in the Z-axis direction so as to connect the main middle coil parts 22*a*1 and 22*a*2. The sub middle coil part 22*b* h as a sufficiently large width so as to connect the left ends of the main middle coil parts 22*a*1 and 22*a*2 in the X-axis direction arranged in parallel. The width of the sub middle coil part 22*b* is about the same as that of the pair of main middle coil parts 22*a*1 and 22*a*2 including their gap.

At the lower end of the sub middle coil part 22*b* in the Z-axis direction, the bottom raising part 30 is integrally formed so as to be continuous with the same width on the same plane. The lower end of the bottom raising part 30 is the mounting part 40.

At the right end of the main middle coil part 22*a*2 in the X-axis direction, the end coil part 21 is connected by bending downward in the Z-axis direction with the same width as the main middle coil part 22*a*2. The bottom raising part 30 is integrally continuous to the lower end of the end coil part 21 in the Z-axis direction with substantially the same width of the end coil part 21. The lower end of the bottom raising part 30 is formed as the mounting part 40.

A pair of grooves 14 extending in parallel in the X-axis direction at a predetermined interval in the Y-axis direction is formed on the core upper surface 11 of the main core 10*a*. The main middle coil parts 22*a*1 and 22*a*2 are accommodated in the grooves 14.

The groove 14 (14) continuing to the groove 14 (14) formed on the upper surface 11 with the same width is formed on the back side and one end of the pair of core side surfaces 12 of the main core 10*a* facing each other in the X-axis direction. The end coil parts 21 of the coil 20 are accommodated in the grooves 14 formed on this side surface 12. The bottom raising part 30 (30) protrudes downward in the Z-axis direction from the lower end of the groove 14 (14) (the bottom surface 13*a* of the main core 10*a*).

A common groove 15 connecting the pair of grooves 14 formed on the upper surface 11 is formed on the front side and the other end of the pair of core side surfaces 12 of the main core 10*a* facing each other in the X-axis direction. The sub middle coil part 22*b* of the coil 20 is accommodated in the common groove 15. The bottom raising part 30 protrudes downward in the Z-axis direction from the lower end of the common groove 15 (the bottom surface 13*a* of the main core 10*a*).

In the coil device 1*b* according to the present embodiment, the middle coil part 22 consists of a plurality of main middle coil parts 22*a*1 and 22*a*2 and the sub middle coil part 22*b*, the entire length of the coil 20 close to the core 10 is large, and the inductance can be improved. The mounting part 40 of the sub middle coil part 22*b* is connected to, for example, an isolated land on a substrate (not shown) and is not connected to another electric circuit on an electric circuit, but may be connected to another electric circuit depending on the purpose of use.

Fourth Embodiment

Figure 1D:
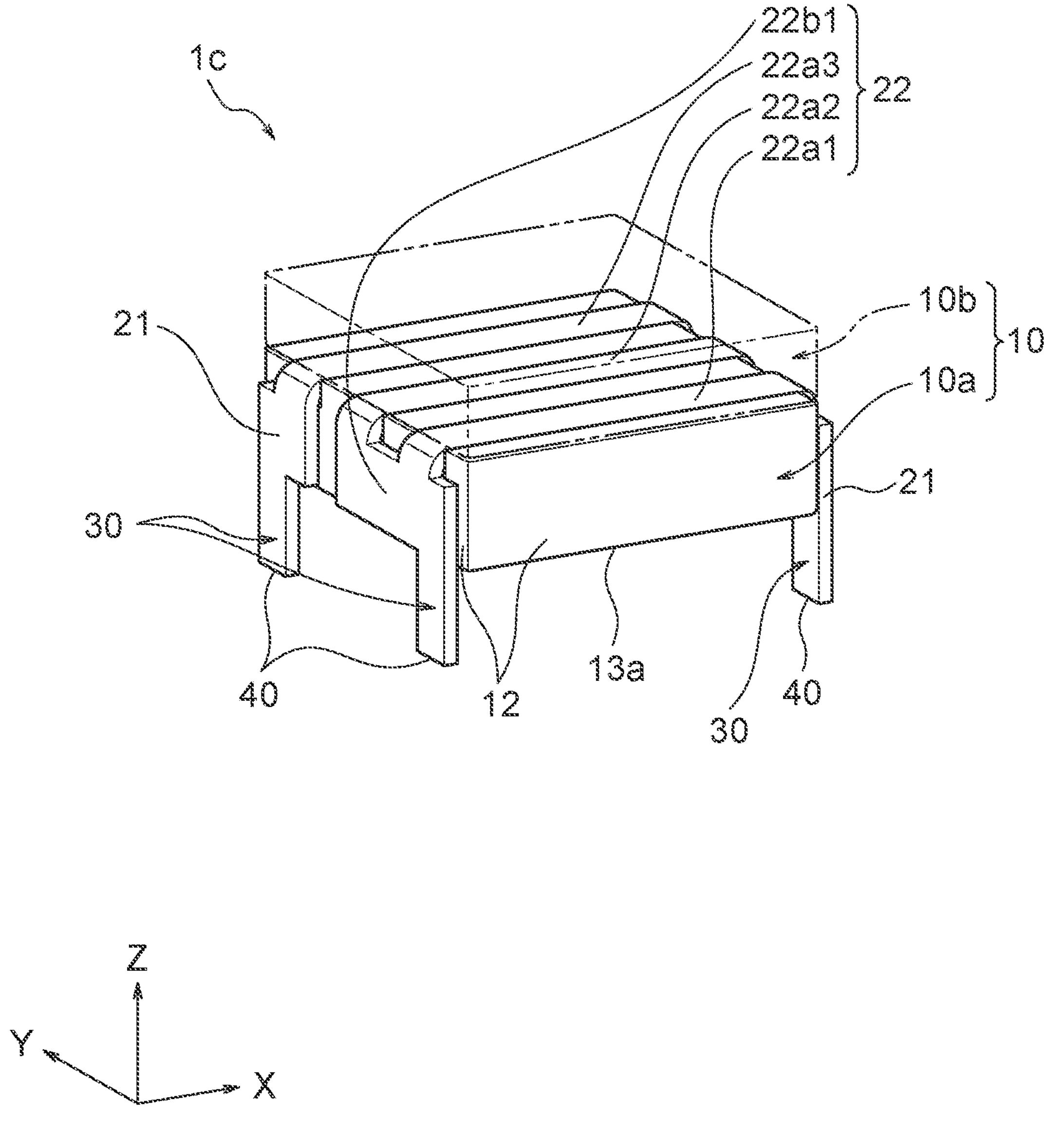
FIG. 1D is a partially transparent perspective view of a coil device according to further another embodiment of the present invention.
Figure 2D:
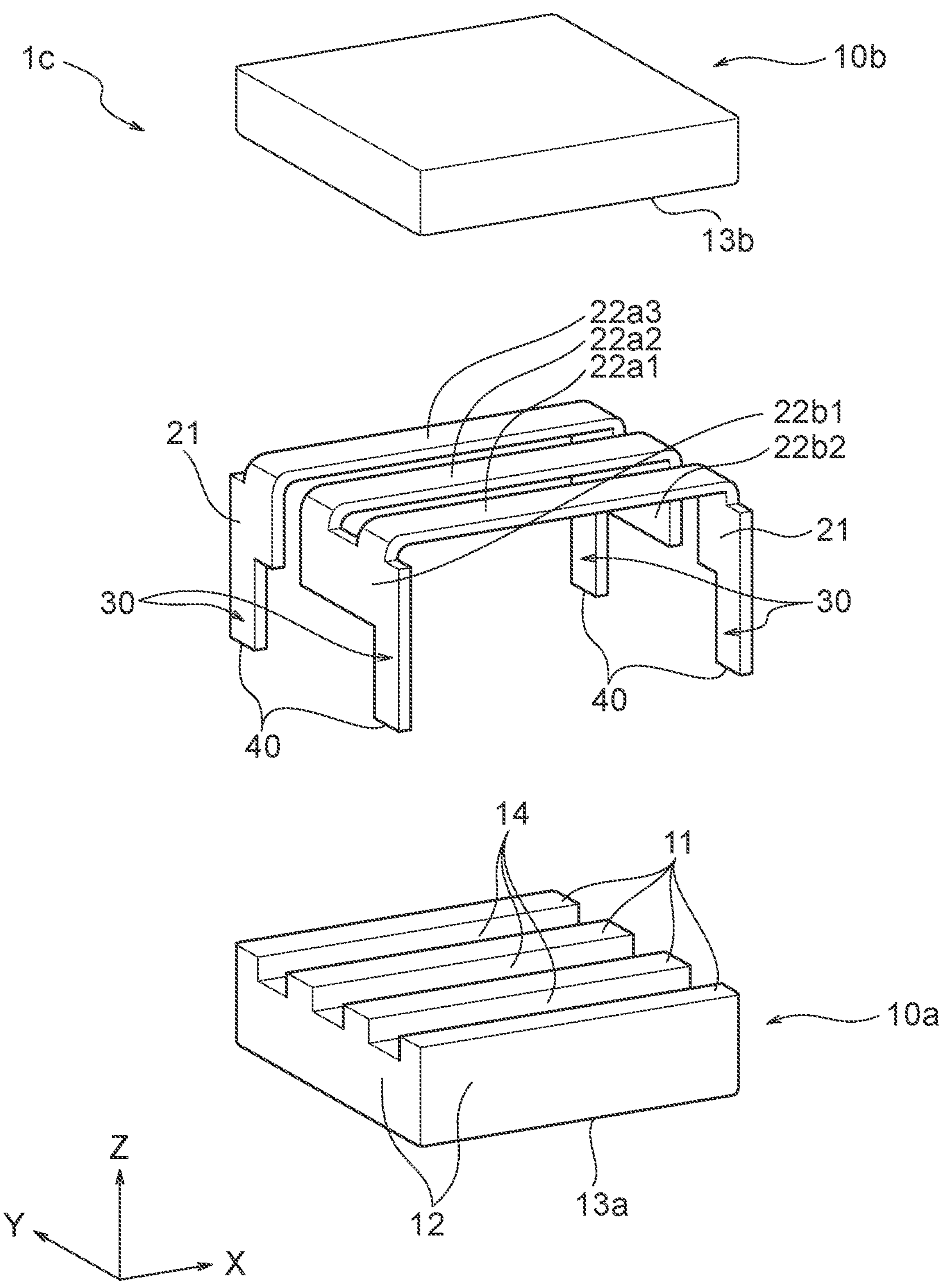
FIG. 2D is an exploded perspective view of the coil device shown in FIG. 1D.

As shown in FIG. 1D and FIG. 2D, a coil device 1*c* according to the present embodiment is different from the coil devices 1, 1*a*, and 1*b* according to the above-mentioned embodiments only in the structure of the coil 20, the structure of the bottom raising part 30, and the structure of the groove 14 formed on the main core 10*a*. The other structure and effect are similar to those of the coil devices 1, 1*a*, and 1*b* according to the above-mentioned embodiments. Thus, the common parts are not partly explained.

In the coil device 1*c* according to the present embodiment, the middle coil part 22 of the coil 20 includes: a plurality of main middle coil parts 22*a*1, 22*a*2 and 22*a*3; a sub middle coil part 22*b*1 connecting the main middle coil parts 22*a*1 and 22*a*2 next to each other; and a sub middle coil part 22*b*2 connecting the main middle coil parts 22*a*2 and 22*a*3 next to each other. The main middle coil parts 22*a*1, 22*a*2 and 22*a*3 are accommodated in a plurality of grooves 14 formed on the upper surface of the main core 10*a* and are linearly arranged in the X-axis direction substantially in parallel at predetermined intervals in the Y-axis direction.

At the right end of the main middle coil part 22*a*1 in the X-axis direction disposed on one end side (front side) in the Y-axis direction, the end coil part 21 is connected by bending downward in the Z-axis direction with a width that is slightly larger than a width of the main middle coil part 22*a*1 (in the Y-axis direction/the same applies hereinafter). The bottom raising part 30 is integrally continuous to the lower end of the end coil part 21 in the Z-axis direction on the same plane with a width that is smaller than a width of the end coil part 21. The lower end of the bottom raising part 30 is formed as the mounting part 40.

At the left ends of the main middle coil parts 22*a*1 and 22*a*2 in the X-axis direction, the sub middle coil part 22*b*1 is formed by bending downward in the Z-axis direction so as to connect the main middle coil parts 22*a*1 and 22*a*2. The sub middle coil part 22*b*1 has a sufficiently large width so as to connect the left ends of the main middle coil parts 22*a*1 and 22*a*2 in the X-axis direction arranged in parallel. The width of the sub middle coil part 22*b*1 is about equal to or larger than that of the pair of main middle coil parts 22*a*1 and 22*a*2 including their gap.

At the lower end of the sub middle coil part 22*b*1 in the Z-axis direction on the front end in the Y-axis direction, the bottom raising part 30 is integrally formed so as to be continuous on the same plane with a width that is smaller than a width of the sub middle coil part 22*b*1. The lower end of the bottom raising part 30 is the mounting part 40. The bottom raising part 30 (30) is as wide as the main middle coil part 22*a*1, 22*a*2, or 22*a*3. Preferably, the main middle coil parts 22*a*1, 22*a*2, and 22*a*3 have substantially the same width.

At the right ends of the main middle coil parts 22*a*2 and 22*a*3 in the X-axis direction, the sub middle coil part 22*b*2 is formed by bending downward in the Z-axis direction so as to connect the main middle coil parts 22*a*2 and 22*a*3. The sub middle coil part 22*b*2 has a sufficiently large width so as to connect the right ends of the main middle coil parts 22*a*2 and 22*a*3 in the X-axis direction arranged in parallel. The width of the sub middle coil part 22*b*2 is about equal to or larger than that of the pair of main middle coil parts 22*a*2 and 22*a*3 including their gap.

At the lower end of the sub middle coil part 22*b*2 in the Z-axis direction on the back end in the Y-axis direction, the bottom raising part 30 is integrally formed so as to be continuous on the same plane with a width that is smaller than a width of the sub middle coil part 22*b*2. The lower end of the bottom raising part 30 is the mounting part 40. This bottom raising part 30 is also as wide as the main middle coil part 22*a*1, 22*a*2, or 22*a*3.

At the left end of the main middle coil part 22*a*3 in the X-axis direction disposed on the other end side (back side) in the Y-axis direction, the end coil part 21 is connected by bending downward in the Z-axis direction with a width that is slightly larger than a width of the main middle coil part **22*a*3. The bottom raising part 30 is integrally continuous to the lower end of the end coil part 21 in the Z-axis direction on the same plane with a width that is smaller than a width of the end coil part 21. The lower end of the bottom raising part 30 is formed as the mounting part 40**.

Three grooves 14 extending in parallel in the X-axis direction at predetermined intervals in the Y-axis direction are formed on the core upper surface 11 of the main core **10*a*. The main middle coil parts 22*a*1, 22*a*2 and 22*a*3 are accommodated in the grooves 14**.

No groove is formed on the pair of core side surfaces 12 of the main core **10*a* facing each other in the X-axis direction. The sub middle coil part 22*b*1 and the end coil part 21 are arranged close to the core side surface 12 in this order at a predetermined interval in the Y-axis direction on the core side surface 12 on the left side in the X-axis direction. The end coil part 21 and the sub middle coil part 22*b*2 are arranged close to the core side surface 12 in this order at a predetermined interval in the Y-axis direction on the core side surface 12 on the right side in the X-axis direction. The bottom raising parts 30 protrude downward in the Z-axis direction from the bottom surface 13*a* of the main core 10*a***.

In the coil device **1*c* according to the present embodiment, the middle coil part 22 consists of the plurality of main middle coil parts 22*a*1, 22*a*2, and 22*a*3 and the sub middle coil parts 22*b*1 and 22*b*2. Thus, the entire length of the coil 20 close to the core 10 is large, and the inductance can be improved. The mounting parts 40 of the sub middle coil parts 22*b*1 and 22*b*2** are connected to, for example, an isolated land on a substrate (not shown) and is not connected to another electric circuit on an electric circuit, but may be connected to another electric circuit depending on the purpose of use.

Incidentally, the present invention is not limited to the above-mentioned embodiments and can variously be modified within the scope of the present invention.

In addition to the inductor of the power supply system circuit, the coil device according to the present invention is used as, for example, the noise filter, the transformer, the coupled inductor, or the like.

DESCRIPTION OF THE REFERENCE NUMERICAL

1, **1*a*-1*c*** . . . coil device
10 . . . core
**10*a*** . . . main core
**10*b*** . . . sub core
11 . . . upper surface
12 . . . side surface
**13*a*, 13*b*** . . . bottom surface
14 . . . groove
15 . . . common groove
20 . . . coil
21 . . . end coil part
**21*a*** . . . main end coil part
**21*b*** . . . joint part
22 . . . middle coil part
**22*a*1, 22*a*2** . . . main middle coil part
**22*b*, 22*b*1, 22*b*2** . . . sub middle coil part
30 . . . bottom raising part
**30*a*** . . . leg part
40 . . . mounting part
41 . . . bending piece
50 . . . substrate
51 . . . installation surface
**52*a*, 52*b*** . . . land
60 . . . solder
70 . . . another electronic component

What is claimed is:

1. A coil device comprising:
a core;
a coil at least partly disposed close to the core;
a mounting part for being mounted on an installation surface; and
a bottom raising part connected with the coil and extending to the mounting part so as to form a gap having a predetermined height between a lower surface of the mounting part and a bottom surface of the core, wherein
a length of the mounting part extending in a direction away from the core is larger than the predetermined height,
the core includes a main core and a sub core disposed on an upper surface of the main core,
a side groove is formed on a side surface of the main core so that a side surface of the coil does not protrude from the side surface of the main core, and
a bottom groove connected to the side groove is formed on a bottom surface of the main core.

2. The coil device according to claim 1, wherein the predetermined height is 0.5 to 5.0 mm.

3. The coil device according to claim 1, wherein the coil and the bottom raising part are made of one continuous plate conductor or flat wire.

4. The coil device according to claim 1, wherein the bottom raising part is as wide as the mounting part.

5. The coil device according to claim 1, wherein the mounting part extends from a lower end of the bottom raising part.

6. The coil device according to claim 1, wherein the coil includes:
an end coil part connected to the bottom raising part; and
a middle coil part connected to the end coil part.

7. The coil device according to claim 1, wherein a width of the bottom raising part is equal to or larger than a maximum width of the middle coil part and equal to or smaller than a maximum width of the core.

8. The coil device according to claim 6, wherein
the bottom raising part includes a plurality of leg parts, and
the end coil part includes:
a main end coil part connected to the middle coil part; and
joint parts connecting the main end coil part and the plurality of leg parts.

9. The coil device according to claim 6, wherein the middle coil part includes:
a plurality of main middle coil parts; and
a sub middle coil part connecting the main middle coil parts next to each other.

10. The coil device according to claim 1, wherein the coil is at least partly sandwiched by the main core and the sub core.

11. The coil device according to claim 10, wherein the main core includes an upper groove connected to the side groove, the upper groove being formed on an upper surface of the main core.

12. The coil device according to claim 10, wherein at least either one of the main core and the sub core is a molded core.

* * * * *